United States Patent
Karl

(10) Patent No.: US 6,584,785 B1
(45) Date of Patent: Jul. 1, 2003

(54) VEHICLE HEATING INSTALLATION USING AN EVAPORATOR AS HEAT SOURCE

(75) Inventor: Stefan Karl, Paris (FR)

(73) Assignee: Valeo Climatisation, La Verriere (FR)

(*) Notice: Subject to any disclaimer, the term of this patent is extended or adjusted under 35 U.S.C. 154(b) by 0 days.

(21) Appl. No.: 08/931,729

(22) Filed: Sep. 16, 1997

(30) Foreign Application Priority Data

Sep. 17, 1996 (FR) .............................. 96 11325

(51) Int. Cl.⁷ .............................. F25B 41/00; F25B 5/00
(52) U.S. Cl. .......................... 62/117; 62/174; 62/196.4
(58) Field of Search .................. 62/324.4, 196.4, 62/174, 117

(56) References Cited

U.S. PATENT DOCUMENTS

| | | | |
|---|---|---|---|
| 3,472,040 A | * 10/1969 | Taylor | 62/174 X |
| 5,056,324 A | * 10/1991 | Haley | 62/174 X |
| 5,291,941 A | 3/1994 | Enomoto et al. | 165/62 |

FOREIGN PATENT DOCUMENTS

| | | | |
|---|---|---|---|
| DE | 31 37 464 A1 | 7/1983 | F24J/3/04 |
| DE | 41 24 888 C2 | 1/1993 | B60H/1/00 |
| EP | 0 733 504 | 9/1996 | |
| FR | 2 717 126 | 9/1995 | |
| FR | 27 20 982 A1 | 12/1995 | B60H/1/32 |
| WO | WO 95/24323 A1 | 9/1995 | B60H/1/00 |

OTHER PUBLICATIONS

U.S. patent application S/N 08/620,388—patent pending
French Search Report dated Mar. 30, 1997.
German Search Report dated Nov. 24, 1997.
English Abstract of WO 95/24323 A1.
English Abstract of DE 31 37 464 A1.

* cited by examiner

*Primary Examiner*—William Wayner
(74) *Attorney, Agent, or Firm*—Morgan & Finnegan, LLP

(57) ABSTRACT

A motor vehicle has an air conditioning installation which also serves for heating the cabin of the vehicle. In the heating mode, the refrigerant fluid in the air conditioning circuit flows in a bypass branch which bypasses the condenser. The evaporator therefore receives the fluid in the gaseous state, and acts as a heat exchanger for dissipating the heat produced by the compressor. The heat dissipated by the evaporator can be used for heating the cabin when the heat produced by the engine of the vehicle is insufficient, and means are provided for adjusting, according to demand, the quantity of fluid contained in the heating loop of the circuit, by drawing fluid from, or passing fluid into, the branch (2) of the circuit which contains the condenser.

29 Claims, 2 Drawing Sheets

VEHICLE HEATING INSTALLATION USING AN EVAPORATOR AS HEAT SOURCE

FIELD OF THE INVENTION

This invention relates to heating installations for vehicles, in particular motor vehicles, and more particularly to air conditioning installations for motor vehicles, having an evaporator which is used as a source of heat when the installation is operating in a heating mode.

More specifically still, the invention relates to an air conditioning installation for the cabin of a motor vehicle, comprising a refrigerant fluid circuit having three branches, namely a first branch, a second branch and a third branch, with an evaporator and a compressor being connected in the first branch, with the compressor downstream of the evaporator; a condenser is arranged in the second branch, and there is no condenser in the third branch. The second and third branches are connected in parallel with each other in such a way that the first and second branches together constitute a cooling loop, while the first and third branches together constitute a heating loop. A first expansion device is interposed in the cooling loop between the condenser and the evaporator; and flow control means, typically in the form of at least one stop or changeover valve, are also provided for passing fluid leaving the first branch into either the second or the third branch. Finally, the installation also includes means for passing air into the cabin of the vehicle after the air has undergone heat exchange with the evaporator.

BACKGROUND OF THE INVENTION

An installation of the above specific type is known from French patent specification No. FR 2 717 126 A, in which the thermal energy generated in the heating loop is determined by the mass flow of fluid produced by the compressor, which is itself a function of the speed at which the compressor is driven, and therefore of the prevailing running speed of the engine of the vehicle. The heating power available can under these circumstances be less than that which is necessary for heating of the cabin. In particular, at the time when the engine is being started from cold under cold weather conditions, the initial density of the fluid in the air conditioning circuit, and consequently the fluid mass flow produced by the compressor, is usually insufficient to provide satisfactory heating.

DISCUSSION OF THE INVENTION

The object of the invention is to overcome these drawbacks, and to enable the thermal energy produced to be matched to the demand for heating, especially at low ambient temperatures.

According to the invention, an air conditioning installation for the cabin of a motor vehicle, comprising a refrigerant fluid circuit having a first branch containing an evaporator followed by a compressor, a second branch containing a condenser, and a third branch not containing a condenser, the second and third branches being connected in parallel with each other so that they respectively constitute, with the first branch, a cooling loop which also contains a first expansion device interposed between the condenser and the evaporator, and a heating loop, with flow control means being provided for sending the fluid leaving the first branch into either the second branch or the third branch, the installation further including means for sending into the cabin air which has exchanged heat with the evaporator, wherein the installation further includes flow varying means for causing the quantity of fluid flowing in the heating loop to be varied according to demand, the flow varying means comprising limiting means for interrupting or momentarily restricting the flow of the fluid in the third branch, whereby to permit the compressor to draw fluid from the second branch, and discharge means for putting the second branch into momentary communication with the outlet of the compressor.

In some embodiments of the invention, the flow control means comprise a first valve connected in the second branch upstream of the condenser, and a second valve connected in the third branch, the valves being connected to a control unit for controlling the valves.

In other embodiments, the flow control means comprise a three-way valve defining a first fluid path from the downstream end of the first branch to the upstream end of the second branch, and a second fluid path from the downstream end of the first branch to the upstream end of the third branch, the valve being connected to a control unit for controlling the valve.

The flow control means preferably include means for measuring the pressure of the fluid at the outlet of the compressor, the measuring means being connected to the control unit.

According to a preferred feature of the invention, the limiting means comprises a differential pressure regulator interposed in the third branch and constituting a second expansion device for authorizing passage of the fluid only when the difference in pressure between its inlet and its outlet exceeds a predetermined threshold value.

In a preferred arrangement where the flow control means comprise a first valve connected in the second branch upstream of the condenser, and a second valve connected in the third branch, the valves being connected to a control unit for controlling the valves, the limiting means include the second valve, which is arranged to be closed by the control unit in response to a low pressure detected by the measuring means. With this arrangement, the third branch may include a constriction downstream of the second valve, the constriction constituting a second expansion device.

According to another preferred feature of the invention, the discharge means comprises a bypass duct bypassing the flow control means, with an over-pressure relief valve interposed in the bypass duct, whereby fluid leaving the compressor can be passed to the second branch.

With this last mentioned arrangement, and where the flow control means comprises a first valve connected in the second branch upstream of the condenser, and a second valve connected in the third branch, the valves being connected to a control unit for controlling the valves, the bypass duct may be connected in parallel with the first valve. Alternatively, the bypass duct may be connected between the output of the second valve and the output of the first valve.

In other embodiments of the installation according to the invention which includes a bypass duct and over-pressure release valve as defined above, and in which the flow control means comprises a three-way valve defining a first fluid path from the downstream end of the first branch to the upstream end of the second branch, and a second fluid path from the downstream end of the first branch to the upstream end of the third branch, the three-way valve being connected to a control unit for controlling the valve, the bypass duct is connected between one of the two sides of the three-way valve that are connected to the first and third branches respectively, and the side of the three-way valve that is connected to the second branch.

In embodiments of the invention in which the flow control means include measuring means for measuring the fluid pressure at the compressor outlet, the measuring means being connected to a control unit, the flow control means further including a first valve connected in the second branch upstream of the condenser, and a second valve connected in the third branch, the valves being connected to the control unit for control of the valves, the discharge means are adapted to cause momentary opening of the first valve by the control unit, as a function of the pressure in the fluid as detected by the measuring means, whereby to enable fluid leaving the compressor to be passed to the second branch.

With this last mentioned arrangement, the discharge means may be adapted to compare the pressure in the fluid as detected by the measuring means with a maximum threshold value of pressure, and to cause the first valve to be opened momentarily when the detected pressure exceeds the threshold value. In addition, a non-return valve is preferably disposed in the second branch downstream of the condenser and either upstream or downstream of the first expansion device.

Alternatively, the discharge means may be adapted to compare the fluid pressure detected by the measuring means with a datum value of pressure computed by the control unit as a function of heating demand, and to cause the first valve to open momentarily when the detected pressure exceeds the datum value.

According to another preferred feature of the invention, the first expansion device is a thermostatic expansion device disposed in the second branch downstream of the condenser.

Preferably, the first expansion device is a calibrated orifice disposed in the second branch downstream of the condenser, and a fluid accumulator is disposed in the first branch between the evaporator and the compressor.

Further features and advantages of the invention will appear more clearly on a reading of the following detailed description of some preferred embodiments of the invention, which is given by way of non-limiting example only and with reference to the accompanying drawings.

BRIEF DESCRIPTION OF THE DRAWINGS

In the drawings, those elements which are identical or similar to each other are designated in all the Figures by the same reference numerals.

DESCRIPTION OF PREFERRED EMBODIMENTS OF THE INVENTION

Figure 1:
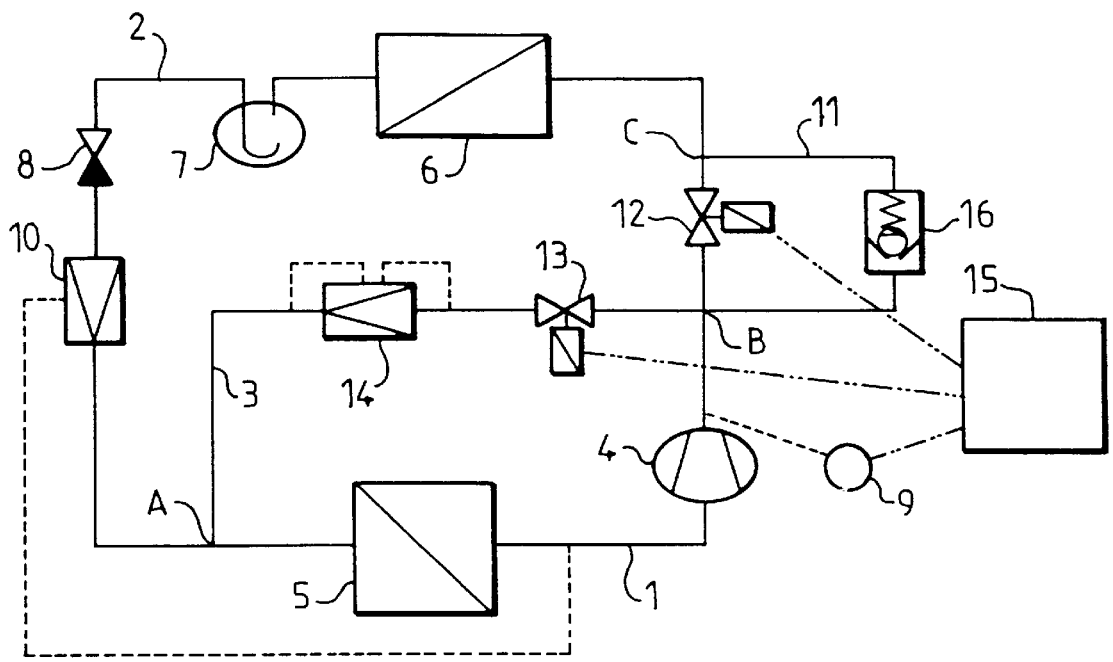
FIGS. 1 to 4 are circuit diagrams of fluid refrigerant circuits in four installations according to the invention, for air conditioning and heating of the cabin of a vehicle, with each Figure showing a different version incorporating features of the invention.

As is usual in vehicle air conditioning installations, in each of the circuits shown in the drawings a refrigerant fluid flows, passing from the liquid state to the gaseous state on absorbing heat, and from the gaseous state to the liquid state on yielding heat. Most of the components of the circuits shown in the drawings are commonly found in current air conditioning installations for vehicles.

In each of FIGS. 1 to 4, the components of the circuit are disposed in three branches 1, 2 and 3 which are joined together at two junction points A and B. The branch 1 contains a compressor 4 which drives the fluid in the circuit from point A to point B, and an evaporator 5 connected upstream of the compressor. A pressure sensor 9 detects the pressure of the fluid at the outlet of the compressor. The branch 2 contains, in this order going downstream from the point B towards the point A, a condenser 6, a bottle or reservoir 7, a non-return valve 8, and a thermostatic first expansion device or depressurizer 10.

In the circuit shown in FIG. 1, a two-way electric stop valve 12 is connected in the branch 2 between the junction point B and the condenser 6. A similar valve 13 is connected in the branch 3, in which there is also connected, downstream of the valve 13, a differential pressure regulator 14 which also serves as a second expansion device. The valves 12 and 13 are controlled by a control module 15 which receives the signals from the pressure sensor 9. A bypass duct 11, containing an over-pressure relief valve 16, is connected between the junction point B and a point C situated on the branch 2 between the valve 12 and the condenser 6, so that the relief valve 16 is in parallel with the stop valve 12.

In operation of the installation in a cooling mode, the control module 15 opens the valve 12 and closes the valve 13. The refrigerant fluid flows in the conventional cooling loop constituted by the branches 1 and 2 of the circuit. More precisely, the fluid delivered by the compressor 4 passes through the point B, the valve 12 and the point C so as to reach the condenser 6, in which it is condensed so as to give up heat to the surrounding ambient air. The fluid then passes through the bottle 7 and the non-return valve 8, and its pressure is reduced in the thermostatic expansion device 10. The fluid evaporates in the evaporator 5, so cooling the air which is then passed into the cabin of the vehicle. The gaseous fluid leaving the evaporator 5 is once more taken to the inlet of the compressor 4.

When the circuit of FIG. 1 is operating in the heating mode, the valve 12 is closed and the valve 13 is open. The fluid now flows in a heating loop constituted by the branches 1 and 3. On leaving the compressor 4, the fluid passes through the point B and the valve 13, and its pressure is reduced in the differential pressure regulator 14, from which, still in the gaseous condition, it reaches the evaporator 5. The fluid yields heat in the evaporator to the air which is then passed into the cabin of the vehicle. From the evaporator 5 the fluid is again passed to the compressor.

When the pressure of the fluid in the heating loop is abnormally low, either because there is not enough mass of fluid in the heating loop, or because the temperature is too low, the differential pressure regulator 14 is closed. The compressor then draws fluid from the branch 2, and in particular from the reservoir 7, through the evaporator 5. The quantity of fluid in the heating loop therefore increases, and in consequence the pressure at the outlet of the compressor also increases. When the fluid pressure reaches a value sufficient to open the regulator 14, a flow of fluid is established in the heating loop. The fluid in the liquid state that may be upstream of the evaporator in the branch 1 evaporates. The pressure downstream of the non-return valve 8 in the branch 2 rises above the value of the pressure upstream of the valve 8, so that the transfer of fluid from the reservoir 7 is interrupted.

If on the other hand the pressure of fluid in the heating loop exceeds a predetermined threshold value, the over-pressure relief valve 16 opens, so that some of the fluid is transferred from the heating loop to the condenser 6. This can occur after a phase in which the fluid is pumped in the heating loop, or in the event of elevation of the pressure due to high-speed running of the engine of the vehicle. In this first version shown in FIG. 1, the pressure sensor 9 does not normally play a part in the control of the flow of fluid in the various branches of the circuit, but serves only to monitor the pressure at the outlet of the compressor.

Figure 2:
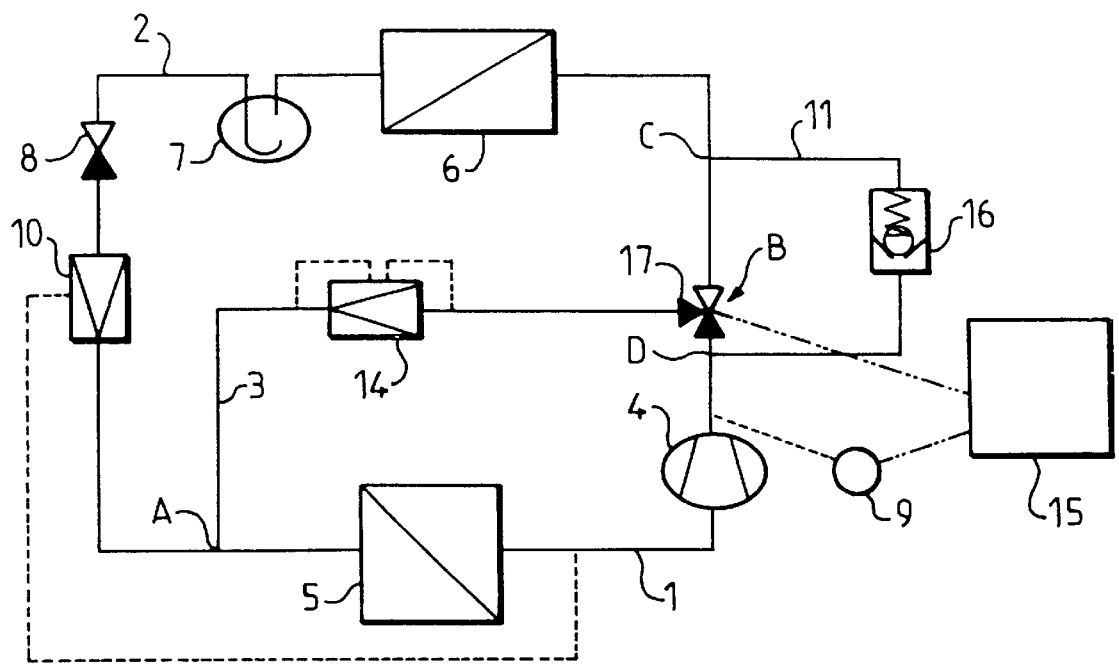

Reference is now made to FIG. 2. The circuit in FIG. 2 is different from that in FIG. 1 in that the two simple two-way valves 12 and 13 are replaced by a single three-way valve 17 which is located at the junction point B. The three ports (or "ways") of this valve 17 are connected with the branches 1, 2 and 3 respectively, with the inlet end of the bypass duct 11 being connected in the branch 1 at a junction point D downstream of the compressor 4. The three-way valve 17 is controlled by the control module 15 so as to connect selectively the downstream end of the branch 1, either to the upstream end of the branch 2 or to the upstream end of the branch 3. The fluid flows under the same conditions as described above in connection with the circuit shown in FIG. 1.

In another version, the upstream end of the bypass duct 11 may be connected to the branch 3, upstream of the differential pressure regulator 14. In this connection, reference is now made to FIG. 3. In the circuit in FIG. 3, the only difference from that shown in FIG. 1 is that the upstream or inlet end of the bypass duct 11 is connected at a junction point E in the branch 3, between the valve 13 and the differential pressure regulator 14. The over-pressure relief valve 16 is then subjected to the pressure at the inlet of the regulator 14, which is substantially identical to the pressure at the outlet of the compressor 4 when the fluid is flowing in the heating loop 1, 3.

It is also possible within the scope of the invention to replace the differential pressure regulator 14 by a simple constriction in the branch 3. In that case, in order to enable the mass of refrigerant fluid flowing in the heating loop to be increased, the control module 15 causes the valve 13 to close according to the pressure detected by the sensor 9. Both of the valves 12 and 13 are then momentarily closed.

It is similarly possible to omit the bypass duct 11 and the over-pressure relief valve 16, and to provide return of excess fluid from the heating loop to the condenser by opening for a moment the valve 12, which is still controlled by the control module 15 as a function of the pressure detected by the sensor 9.

The return of excess fluid through the bypass loop enables the pressure of the fluid at the outlet of the compressor to be reduced. This return of fluid is therefore based on detection of the pressure of the fluid by measuring means, that is to say, in this example, the sensor 9.

In a first version, the control module 15 compares the measured fluid pressure with a maximum pressure threshold value, and controls the momentary opening of the first valve 12 once the measured pressure exceeds the maximum threshold value. This then enables the bypass duct 11 and the over-pressure relief valve 16 to be omitted as mentioned above.

In another version, the measured fluid pressure is compared with a datum value of pressure which is itself computed by the control module 15 according to the heating demand. The momentary opening of the valve 12 is then commanded when the measured fluid pressure exceeds the datum value.

Figure 3:
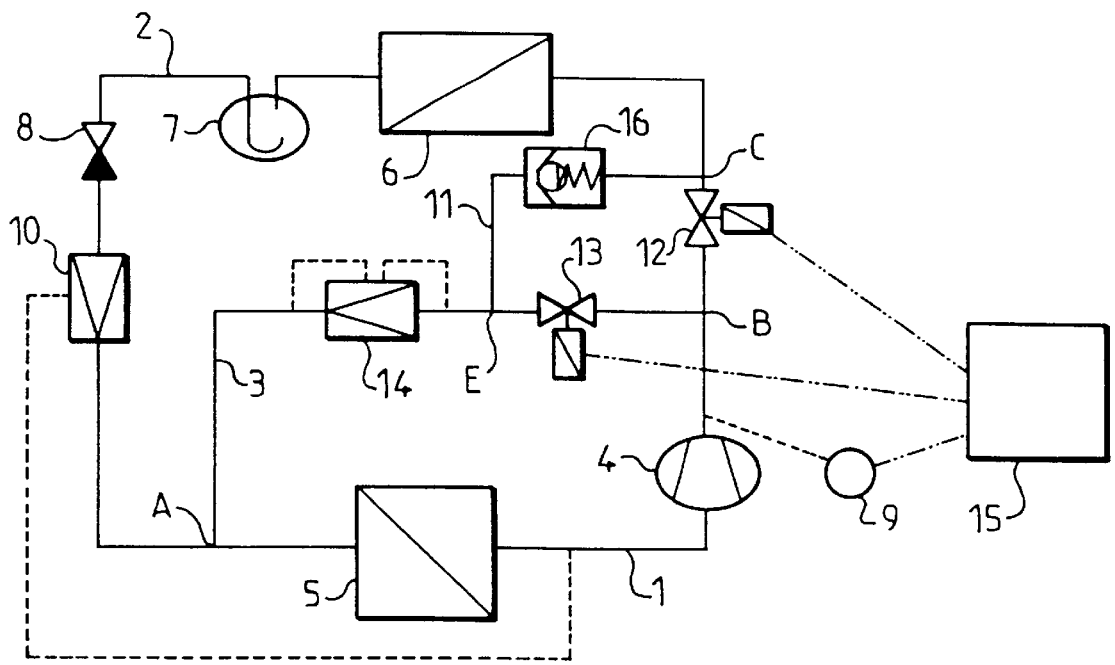

It should be noted that this second version can be used in all versions of the invention, and not only that shown in FIG. 3. In this connection, the power of the additional heating apparatus depends on the pressure of the fluid at the outlet of the compressor and on the speed of the compressor, which is itself dependent on the running speed of the engine of the vehicle.

Figure 4:
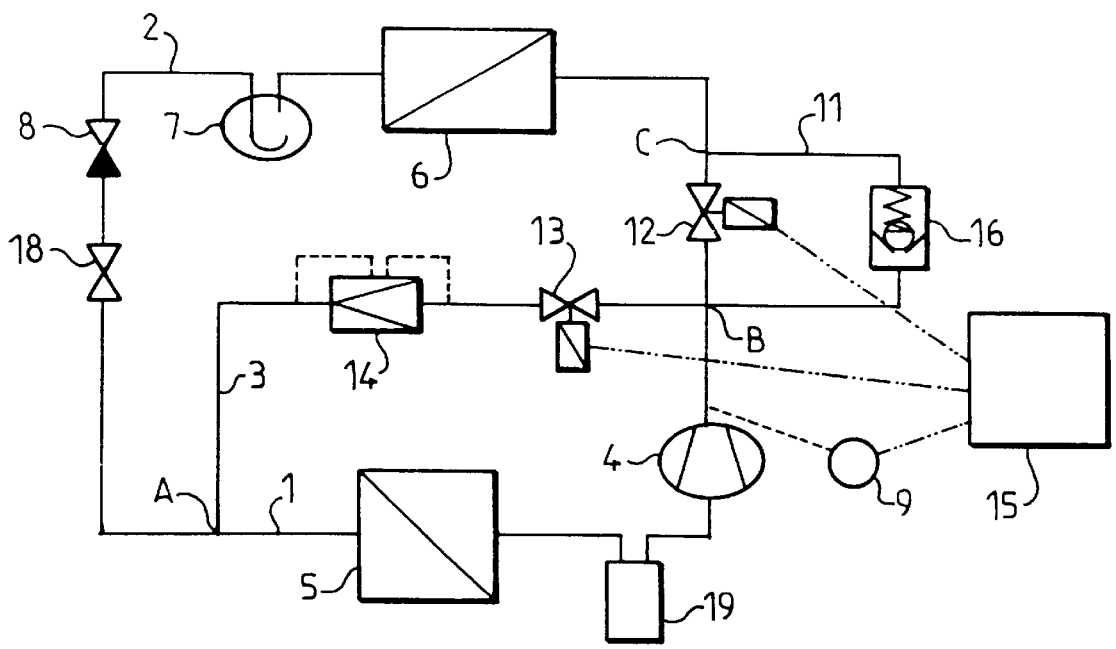

Reference is now made to FIG. 4, which shows a further version of the circuit basically shown in FIG. 1. In FIG. 4, the thermostatic expansion device 10 is replaced by a calibrated orifice 18, while a refrigerant fluid accumulator 19 is connected in branch 1 between the evaporator 5 and the inlet of the compressor 4.

In a further version, not shown, the non-return valve 8 is connected downstream of the expansion device 10 instead of upstream as shown in FIGS. 1 to 3.

What is claimed is:

1. An air conditioning installation for a vehicle, comprising:
   a refrigerant fluid circuit including:
      a first branch,
      a second branch connected to the first branch so that the first and second branches constitute a cooling loop,
      a third branch connected in parallel with the second branch and connected with the first branch so that the first and third branches constitute a heating loop,
      an evaporator in the first branch,
      a compressor in the first branch downstream of the evaporator,
      a condenser in the second branch, the third branch being without any condenser,
      a first expansion device connected in the cooling loop between the condenser and the evaporator, and
      flow control means connected with the first, second and third branches for selectively passing fluid received from the first branch into one of the second and third branches;
   limiting means in the third branch for momentarily interrupting, at least partly, the flow of fluid in the third branch to enable the compressor to draw fluid from the second branch to vary the quantity of fluid flowing in the heating loop; and
   discharge means connected between the second branch and the downstream side of the compressor and adapted to place the second branch momentarily into communication with the compressor.

2. The installation according to claim 1, wherein the flow control means comprises a first valve arranged in the second branch upstream of the condenser, and a second valve arranged in the third branch, the installation further comprising a control unit connected with the first and second valves for controlling the valves.

3. The installation according to claim 2, wherein the flow control means further comprises measuring means associated with the compressor for measuring the pressure of fluid at the outlet of the compressor, and means connecting the measuring means with the control unit.

4. The installation according to claim 3, wherein the flow control means comprise a first valve arranged in the second branch upstream of the condenser, and a second valve arranged in the third branch, the installation further comprising a control unit connected with the first and second valves for controlling the valves, the limiting means comprising the second valve, the control unit being adapted to close the second valve in response to a low pressure detected by the measuring means.

5. The installation according to claim 4, further comprising a constriction in the third branch downstream of the second valve, the constriction comprising a second expansion device.

6. The installation according to claim 3, wherein the flow control means comprises a first valve arranged in the second branch upstream of the condenser, and a second valve arranged in the third branch, the installation further comprising a control unit connected with the first and second valves for controlling the valves, the discharge means being adapted to open the first valve momentarily, the control unit being adapted to cause the discharge means to effect momentary opening of the first valve in response to fluid pressure detected by the measuring means to pass fluid from the compressor to the second branch.

7. The installation according to claim 6, wherein the discharge means is adapted to compare fluid pressure detected by the measuring means with a maximum threshold value, and to open the first valve momentarily when the detected pressure exceeds the threshold value.

8. The installation according to claim 6, wherein the control unit is adapted to compute a datum value of pressure of the fluid, the discharge means being adapted to compare the fluid pressure detected by the measuring means with the datum value and to effect the momentary opening of the first valve when the detected pressure exceeds the datum value.

9. The installation according to claim 6, further comprising a non-return valve arranged in the second branch downstream of the condenser, the first expansion device being connected with one side of the non-return valve.

10. The installation according to claim 1, wherein the flow control means comprises a three-way valve having a first port at the downstream end of the first branch, a second port at the upstream end of the second branch and a third port at the upstream end of the third branch, for selectively defining a first fluid flow path from the first branch into the second branch through the first and second ports, and a second fluid flow path from the first branch into the third branch through the first and third ports, the installation further comprising a control unit connected to the three-way valve for controlling the three-way valve.

11. The installation according to claim 1, wherein the limiting means comprises a differential pressure regulator having an inlet and an outlet, the regulator being interposed in the third branch and comprising a second expansion device, and being adapted to permit the fluid to pass therethrough only when the difference in pressure between the inlet and the outlet exceeds a predetermined threshold value.

12. The installation according to claim 1, wherein the discharge means comprises a bypass duct connected between the compressor outlet and the second branch and bypassing the flow control means, and over-pressure relief valve in the bypass duct.

13. The installation according to claim 12, wherein the flow control means comprises a first valve arranged in the second branch upstream of the condenser, and a second valve arranged in the third branch, the installation further comprising a control unit connected with the first and second valves for controlling the valves, and wherein the bypass duct is connected in parallel with the first valve.

14. The installation according to claim 12, wherein the flow control means comprises a first valve arranged in the second branch upstream of the condenser, and a second valve arranged in the third branch, the installation further comprising a control unit connected with the first and second valves for controlling the valves, the bypass duct being connected between the downstream side of the second valve and the downstream side of the first valve.

15. The installation according to claim 12, wherein the flow control means comprises a three-way valve having a first port at the downstream end of the first branch, a second port at the upstream end of the second branch, and a third port at the upstream end of the third branch, for selectively defining a first fluid flow path from the first branch into the second branch through the first and third ports, the installation further comprising a control unit connected to the three-way valve for controlling the three-way valve, the bypass duct being connected between one of the first and third ports of the three-way valve and the second port.

16. The installation according to claim 1, wherein the first expansion device is a calibrated orifice arranged in the first branch downstream of the condenser, the installation further comprising a fluid accumulator arranged in the first branch between the evaporator and the compressor.

17. The installation according to claim 1, wherein the first expansion device is a thermostatic expansion device arranged in the second branch downstream of the condenser.

18. The installation according to claim 1, further comprising a reservoir in the second branch, the limiting means enabling the compressor to draw fluid from the reservoir of the second branch to vary the quantity of fluid flowing in the heating loop.

19. A vehicle including the installation of claim 1.

20. The installation according to claim 1, wherein the limiting means varies the quantity of fluid flowing in the heating loop according to heating demand.

21. An air conditioning installation for a vehicle, comprising:
    a fluid circuit comprising a first branch, a second branch and a third branch, the first and second branch forming a cooling loop and the first and third branch forming a heating loop; and
    fluid limiting mechanism, associated with the third branch, to interrupt momentarily, at least partly, fluid flow in the third branch to enable fluid to flow from the second branch to vary the quantity of fluid flowing in the heating loop.

22. The installation according to claim 21, further comprising discharge mechanism to enable the second branch to be in momentarily communication with a downstream of the first branch.

23. The installation according to claim 21, wherein the limiting means varies the quantity of fluid flowing in the heating loop according to heating demand.

24. An air conditioning installation for a vehicle, comprising:
    a fluid circuit comprising a first branch, a second branch and a third branch, the first and second branch forming a cooling loop and the first and third branch forming a heating loop; and
    means, associated with the third branch, for interrupting momentarily, at least partly, fluid flow in the third branch to enable fluid to flow from the second branch to vary the quantity of fluid flowing in the heating loop.

25. The installation according to claim 24, further comprising means for enabling the second branch to be in momentary communication with a downstream of the first branch.

26. The installation according to claim 24, wherein the means for interrupting varies the quantity of fluid flowing in the heating loop according to heating demand.

27. A method of operating an air conditioning installation having a fluid circuit comprising a first branch, a second branch and a third branch, the first and second branch forming a cooling loop and the first and third branch forming a heating loop, the method comprising:
    interrupting, at least partly, the flow of fluid in the third branch to enable fluid flow from the second branch to vary a quantity of fluid flowing in the heating loop.

28. The method according to claim 27, further comprising:
    enabling momentarily fluid communication from the second branch to a downstream of the first branch to allow fluid discharge from the heating loop to the second branch.

29. The method according to claim 27, wherein the interrupting varies the quantity of fluid flowing in the heating loop according to heating demand.

* * * * *